(12) United States Patent
Shingai

(10) Patent No.: US 7,392,831 B2
(45) Date of Patent: Jul. 1, 2008

(54) COMPONENT PART FOR MUSICAL INSTRUMENT, SUCH AS SIDE BOARD FOR PIANO BODY, AND METHOD FOR MANUFACTURING THE SAME

(75) Inventor: Masaji Shingai, Shizuoka-ken (JP)

(73) Assignee: Yamaha Corporation, Hamamatsu-shi (JP)

( * ) Notice: Subject to any disclaimer, the term of this patent is extended or adjusted under 35 U.S.C. 154(b) by 194 days.

(21) Appl. No.: 10/934,658

(22) Filed: Sep. 7, 2004

(65) Prior Publication Data
US 2005/0076762 A1 Apr. 14, 2005

(30) Foreign Application Priority Data
Sep. 4, 2003 (JP) ............................. 2003-313052

(51) Int. Cl.
B27D 1/04 (2006.01)
B27G 1/00 (2006.01)
B27G 11/00 (2006.01)

(52) U.S. Cl. .................... 144/332; 144/346; 144/354

(58) Field of Classification Search ............... 144/329, 144/332, 346, 345, 359, 344–355; 156/196, 156/221, 222, 304.5, 304.1
See application file for complete search history.

(56) References Cited

U.S. PATENT DOCUMENTS

| | | | | |
|---|---|---|---|---|
| 1,242,297 A | * | 10/1917 | Willams et al. | 144/346 |
| 1,401,115 A | * | 12/1921 | Emands | 84/176 |
| 1,553,455 A | * | 9/1925 | Meroni | 312/352 |
| 1,594,889 A | * | 8/1926 | Loetscher | 144/351 |
| 2,516,467 A | * | 7/1950 | Kenyon | 84/274 |
| 4,367,777 A | * | 1/1983 | Baker | 144/346 |
| 4,931,124 A | * | 6/1990 | Baum | 156/245 |
| 5,018,422 A | * | 5/1991 | Coe, Jr. | 84/275 |
| 5,034,259 A | * | 7/1991 | Barker | 428/106 |
| 5,147,486 A | | 9/1992 | Hoffman | |
| 5,662,760 A | | 9/1997 | Tsuda | |
| 5,722,209 A | * | 3/1998 | Delaney et al. | 52/455 |
| 5,746,863 A | * | 5/1998 | Jarrett | 156/218 |
| 5,881,786 A | * | 3/1999 | Wilderman et al. | 144/348 |
| 6,001,452 A | * | 12/1999 | Bassett et al. | 428/105 |
| 6,145,197 A | * | 11/2000 | Kitashima et al. | 29/896.22 |

FOREIGN PATENT DOCUMENTS

| | | | | |
|---|---|---|---|---|
| GB | 1460570 A | * | 1/1977 | |
| JP | 51-103429 A | | 8/1976 | |
| JP | 55-93405 A | | 7/1980 | |
| JP | 63-224902 A | | 9/1988 | |
| JP | 07-088802 A | | 4/1995 | |
| JP | 09174518 A | * | 7/1997 | |
| JP | 9-207103 A | | 8/1997 | |

(Continued)

Primary Examiner—Bena Miller
(74) Attorney, Agent, or Firm—Smith Patent Office

(57) ABSTRACT

One or more plywood base plate members and at least one decorative plate are stuck together on top of each other, to thereby make a decorative plywood board of a given size. A joined decorative plywood board unit of a desired size is made of a plurality of the decorative plywood boards joined by a scarf joint. Then, the joined decorative plywood board unit and one or more base plates, each having a size of the size of the decorative plywood board unit, are attached together on top of each other, to thereby provide a board pile to be used as a component part for a musical instrument.

7 Claims, 4 Drawing Sheets

FOREIGN PATENT DOCUMENTS

| | | | |
|---|---|---|---|
| JP | 10-55169 A | | 2/1998 |
| JP | 10-111681 A | | 4/1998 |
| JP | 10111681 A | * | 4/1998 |
| JP | 2002187105 A | * | 7/2002 |
| JP | 20020187105 A | | 7/2002 |
| JP | 2003211416 A | * | 7/2003 |
| JP | 2005084129 A | * | 3/2005 |

* cited by examiner

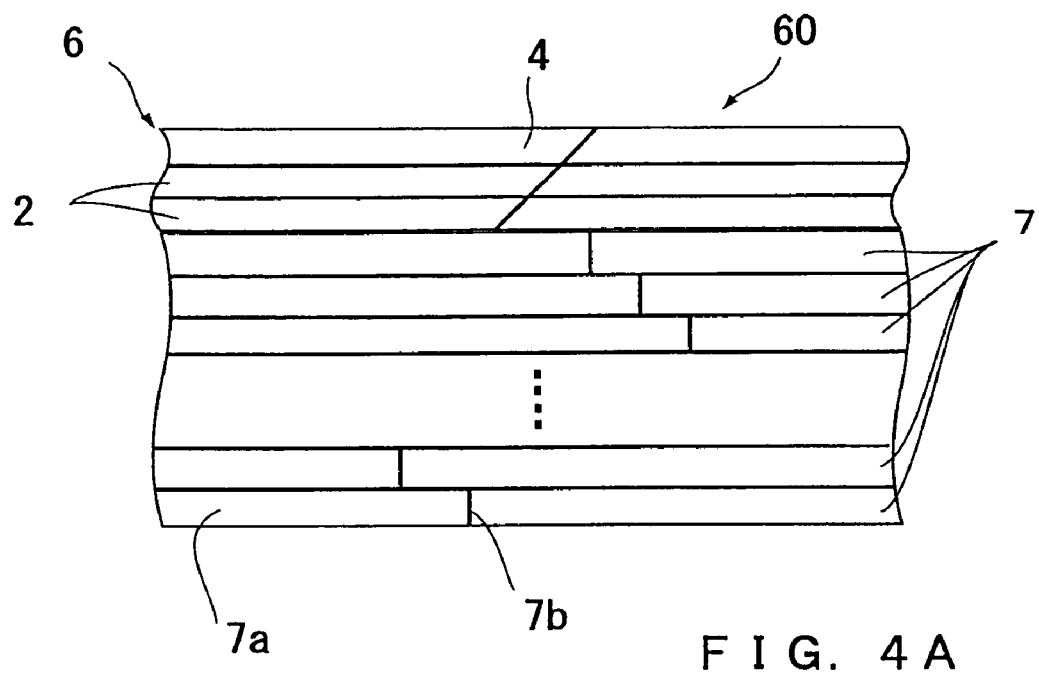
F I G. 4 A
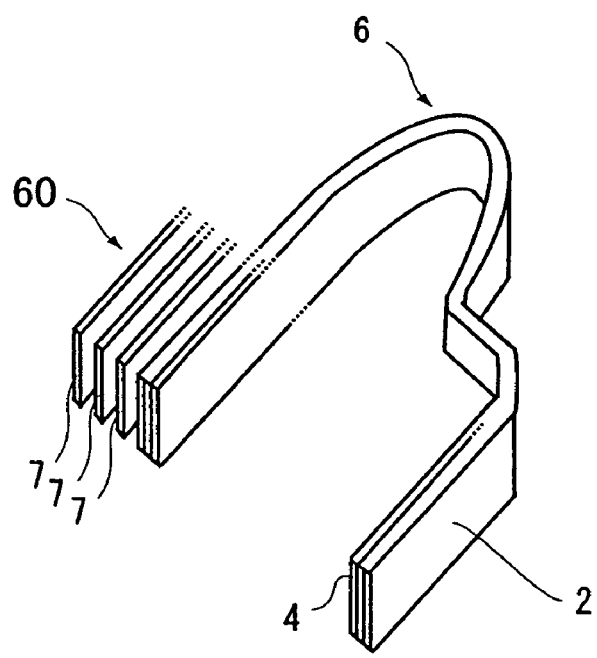
F I G. 4 B

COMPONENT PART FOR MUSICAL INSTRUMENT, SUCH AS SIDE BOARD FOR PIANO BODY, AND METHOD FOR MANUFACTURING THE SAME

BACKGROUND OF THE INVENTION

The present invention relates to a component part for a musical instrument, such as a side board for forming a body of a grand piano. The component part comprises a plurality of plate-shaped members including a decorated (or fancy) plywood board, and a method for manufacturing such an instrument's component part.

Japanese Patent Application Laid-open Publication No. SHO-63-224902 (hereinafter "Patent Document 1") discloses a plywood structure and more particularly, a technique for improving the quality of sounds generated from a given sound generating body using the plywood board structure, by adjusting the resonant characteristics of the plywood board through a combination of respective fiber (or grain) directions, materials, etc. of individual plates stuck on top of each other.

Further, Japanese Patent Application Laid-open Publication No. HEI-9-207103 (hereinafter "Patent Document 2") discloses a method for manufacturing an ordinary type of decorative plywood board. Here, as a step of making a base (plywood) using an upper-layer plate and lower-layer plate with their respective fibers running in their longitudinal directions, the disclosed method includes: severing the upper-layer plate across the width of the plate; positioning and sticking the severed upper-layer plate pieces onto the lower-layer plate in an orientation where the fibers of the plate pieces run in the widthwise direction of the lower-layer plate, to thereby make the base plywood board; and then sticking a decorative veneer sheet (decorative plate) to the top surface of the base plywood board.

Generally, side boards forming the outer peripheral wall surfaces of bodies of grand pianos each comprise a decorative plywood board, which includes a base made of a plurality of plate-shaped wood members joined together end to end in accordance with a necessary length, and a decorative plate stuck on the top surface of the base. Briefly explaining an example of a conventionally-known side board manufacturing method, a first step joins together a plurality of wood plates (veneer sheets) end to end by means of a conventional joint means, such as finger (or combed) joints-,-to-thereby-provide a joined-wood plate unit having an elongated configuration as a whole. The second step adhesively joins, end to end, a plurality of decorative plates having a total length corresponding to the length of the joined wood plate unit, to thereby provide a joined decorative plate unit that has the same length as the joined wood plate unit. Then, a third step sticks a plural number of the wood plate units on top of each other to thereby provide a base plywood board; here, the plural number corresponds to a thickness of a side board to be made. In the third step, it is necessary to position the joined wood plate units, provided by the first step, on top of each other in such a manner that the respective joints (i.e., joined portions between the constituent wood plates) are positionally shifted, in the longitudinal direction, between the individual wood plate units. Namely, because an adhesive is applied to each of the joined portions and the thickness of the joined portion inevitably increases as compared to the remaining portion, the disclosed method attempts to not only deconcentrate or disperse the thickness increases as much as possible and but also minimize a mechanical strength shortage at the joined portions, by positionally shifting the joined portions between the joined wood plate units as noted above.

The fourth step sticks the joined decorative plate unit, provided by the second step, to the base plywood board provided by the third step. The decorative plywood board made in this way is bonded via an adhesive or otherwise after being molded in a mold of a predetermined shape.

Namely, according to the conventional side board manufacturing method, the first step joins together the plurality of wood plates to provide the elongated joined wood plate unit, the second step joins together the plurality of decorative plates to provide the elongated joined decorative plate unit, and then one or more joined wood plate units and the joined decorative plate unit are stuck together. Thus, the conventional manufacturing method requires two joining operations in order to secure the necessary length, which would therefore increase the necessary time and labor. Further, in the conventional manufacturing method, the decorative plates are joined together with their respective end surfaces adhesively bonded with each other merely in an abutting relation in order to make the joints less noticeable. This presents inconveniences in that the joined portions between the decorative plates have a weak joining strength and tend to cause undesired displacement in the thickness direction of the decorative plywood board between the joined decorative plates. Furthermore, for the manufacture of the decorative plywood board, the method requires extra time and labor for positionally shifting the joined portions between the joined wood plate units in the first step.

The method disclosed in Patent Document 2 is basically similar to the above-discussed conventional side board manufacturing method in that a joined decorative plate unit is stuck to the base plywood board, and it does not at all address the problem regarding the number of the joining operations for securing the necessary length and the inconvenience involved in joining the decorative plates together. Patent Document 1 does not particularly discuss a method for manufacturing plywood.

SUMMARY OF THE INVENTION

In view of the foregoing, it is an object of the present invention to provide a technique for reducing the number of necessary steps in the manufacture of a component part for a musical instrument, such as a side board for a body of a grand piano, which comprises a plurality of plates including a decorative plate.

In order to accomplish the above-mentioned object, the present invention provides an improved component part for a musical instrument formed of a board pile, the board pile comprising: a joined decorative plywood board unit of a desired size made by joining, by a scarf joint, a plurality of decorative plywood boards each having a given size, each of the decorative plywood boards comprising one or more plywood base plate members and at least one decorative plate attached (e.g., stuck) together on top of each other; and a base plate layer attached to the joined decorative plywood board unit in overlapping relation thereto.

The present invention also provides a method for manufacturing a component part for a musical instrument formed of a board pile, which comprises: a first step of making a decorative plywood board of a given size by attaching together one or more plywood base plate members and at least one decorative plate on top of each other; a second step of making a joined decorative plywood board unit of a desired size made by joining, by a scarf joint, a plurality of the decorative plywood boards made by the first step; and a third step of providing the board pile by attaching together the joined decorative plywood board unit and one or more base plates on top of each other, each of the one or more base plates having a size corresponding to the size of the joined decorative plywood board unit.

According to the present invention, a decorative plywood board is made previously by attaching (e.g., sticking) together one or more plywood base plate members and at least one decorative plate on top of each other. A plurality of such decorative plywood boards are prepared, each having a given size (longitudinal and lateral dimensions, i.e. length and width), as necessary to together constitute the component part for the musical instrument. These decorative plywood boards are joined end to end, by a scarf joint, to thereby make a joined decorative plywood board unit of a desired size. Then, the joined decorative plywood board unit and a base plate layer (e.g., one or more veneers) are stuck on top of each other, to thereby provide a board pile. The component part for the musical instrument is made using the thus-provided board pile. With such arrangements, the present invention has to perform only one joint operation for securing the necessary length of the joined decorative plywood board unit, i.e. the joint operation using the scarf joint in manufacturing a side board for a body of a grand piano or the like.

Thus, when compared with the conventionally-known technique where the necessary length of the joined decorative plywood board unit is secured by separately joining the plywood board bases and the decorative plates, the present invention can reduce the number of the steps. In this way, it is possible to achieve an enhanced efficiency in manufacturing the component part for the musical instrument. Further, because the decorative plywood boards are joined end to end by the scarf joint, the present invention can significantly increase a joining strength between the decorative plywood boards, and thus the joined decorative plywood boards (i.e., the joined decorative plywood board unit) can be advantageously used in a component part to be formed into a curved shape, such as a side board for a grand piano. In addition, because the decorative plywood boards are joined end to end by a scarf joint, the present invention can significantly enhance the appearance of the finished decorative surface (surface of the decorative plates), and thus the component part manufactured by the present invention can be suitably used as a side board for a grand piano, etc.

The following will describe the embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 4A is a side view used to explain the manufacturing method in accordance with the embodiment of the present invention, which particularly shows a laminated structure of a board pile constructed of a joined decorative plywood board unit and a layer of base plates; and FIG. 4B is a perspective view used to explain how the board pile is formed into a curved shape of the side board for the piano and is adhesively bonded together.

DETAILED DESCRIPTION OF THE EMBODIMENTS

Now, with reference to the drawings, a description will be given about embodiments of a plywood-made component part for a musical instrument of the present invention in relation to a case where the embodiment is embodied as a side board for a musical instrument.

Figure 1:
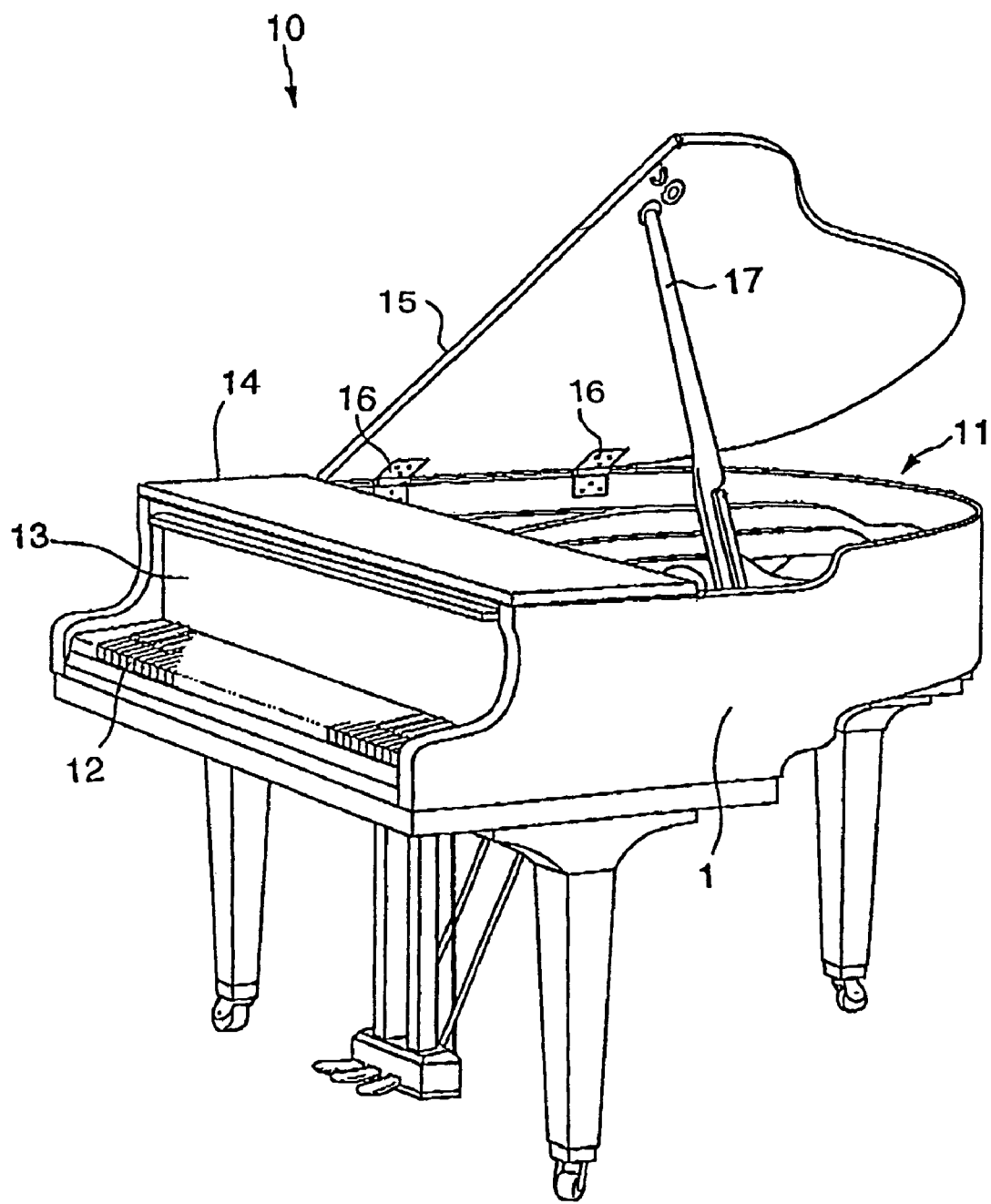
FIG. 1 is a perspective view showing an outer appearance and general structure of a grand piano.

FIG. 1 is a perspective view showing an outer appearance and general structure of a grand piano. As shown, an outer peripheral wall of a body 11 of the grand piano 10, in which are accommodated various components like strings and soundboards, is constructed by the side board 1 formed into a predetermined curved configuration. On the front of the body 11, a keyboard 12 and an openable/closeable keyboard lid 13 are provided. A front roof plate 14 is also provided on an upper front portion of the body 11, and an openable/closeable rear roof portion 15 is provided rearwardly of the front roof plate 14. The rear roof portion 15 is connected to the side board 1 by means of two hinges 16. In FIG. 1, the rear roof portion 15 is shown as held in the open position via a holding bar 17.

The following paragraphs describe a sequence of steps for manufacturing the side board 1, with reference to FIGS. 2 and 3. In the figures, the respective thicknesses of various plates are exaggerated, and, for convenience of the explanation, a longitudinal or lengthwise dimension of the side board 1 is represented by "L" while a widthwise dimension of the side board 1 is represented by "S".

(First Step)

Figure 2A:
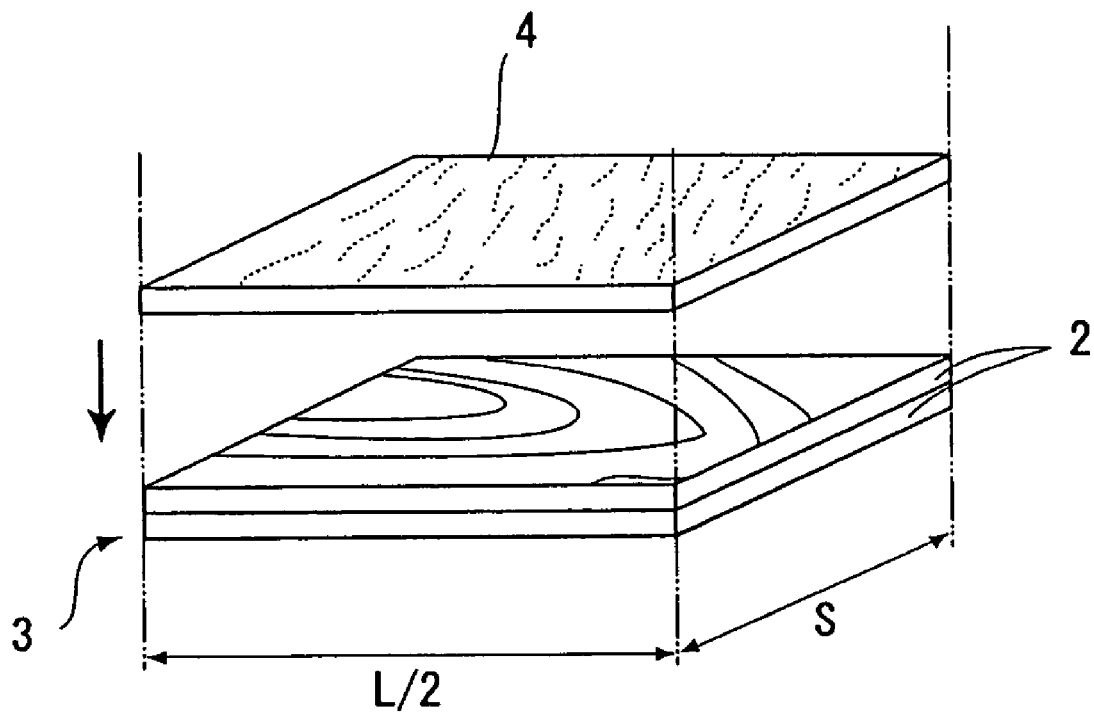
FIG. 2A is a perspective view showing plywood base plate members and a decorative plate, which is an example of a manufacturing method in accordance with an embodiment of the present invention.

In FIG. 2A, a plywood base plate member 2 is in the form of a rectangular wood plate that has a lengthwise dimension substantially equal to "L/2" (in practice, slightly longer than "L/2" in consideration of overlapped portions for a scarf joint to be later described) and a widthwise dimension equal to "S". One or more (in the illustrated example, two) such plywood base plate members 2 are used to form a decorative-plate base 3. In the case where two or more plywood base plate members 2 are used, these plate members 2 are positioned on top of each other with their respective four sides accurately aligned or lined up in the thickness direction of the plate members 2, so as to form a decorative-plate base 3 having a predetermined size, i.e. a lengthwise dimension substantially equal to "L/2" and widthwise dimension equal to "S".

The decorative-plate base 3 is a base to which a decorative plate (or fancy plate) 4 to be later described is to be attached. In the illustrated example, the decorative plate 4 to be attached to the outer surface of the plate base 3 for decorative purposes, is in the form of a veneer sheet or single-panel plate, which is also a rectangular plate having a predetermined size, i.e. a lengthwise dimension substantially equal to "L/2" and a widthwise dimension equal to "S". Any desired fiber (or grain) direction may be chosen for each of the plate members 2 and the decorative plate 4.

Figure 2B:
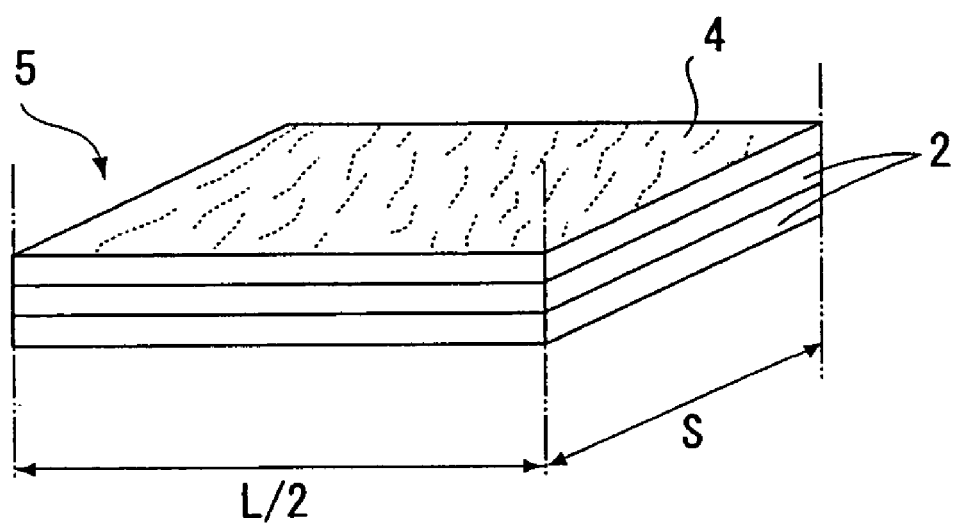
FIG. 2B is a perspective view showing the plywood base plate members and decorative plate stuck together to provide a decorative plywood board.

In the first step, a plurality of the plate members 2 for forming the decorative-plate base 3 and the decorative plate 4 to be attached to the outer surface of the outermost (uppermost) plate member 2 are superposed on each other, in a laminated fashion, with their respective four sides accurately aligned or lined up in the thickness direction of the side board 1, and then attached together by means of an adhesive applied between opposed surfaces of the plates 2 and 4. In this way, a decorative plywood board 5 having the decorative plate 4 attached to the base 3 is made, as illustrated in FIG. 2B. The thus-made decorative plywood board 5 has a predetermined size, i.e. a lengthwise dimension substantially equal to "L/2" and a widthwise dimension equal to "S".

In the instant embodiment, two decorative plywood boards 5, each made in the above-described first step, are prepared, in order to manufacture one side board 1 through the step sequence.

(Second Step)

Figure 3A:
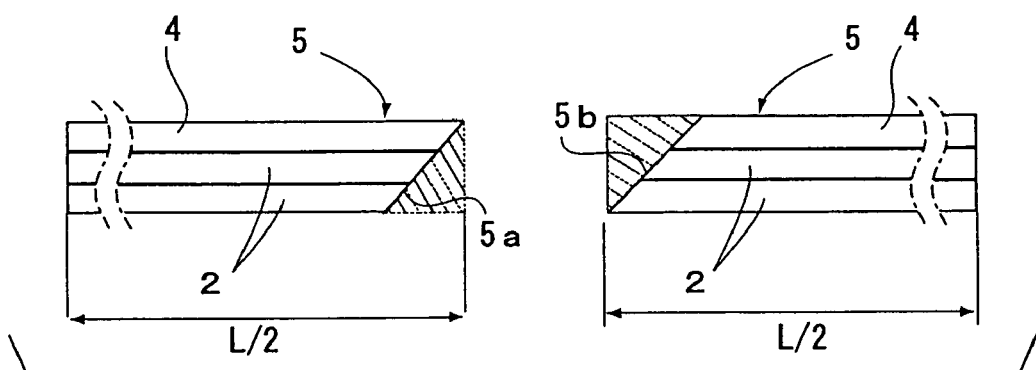
FIG. 3A is a side view used to explain the manufacturing method in accordance with an embodiment of the present invention, and particularly shows how two decorative plywood boards are joined end to end.
Figure 3B:
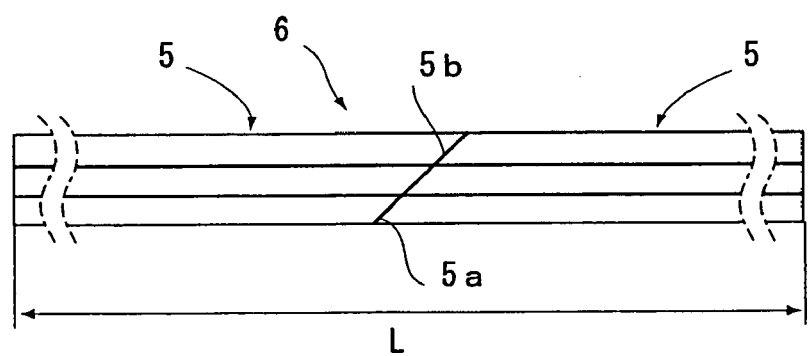
FIG. 3B is a side view showing the two decorative plywood boards having been joined by a scarf joint.

In the second step, the two decorative plywood boards 5 are joined together, end to end, by means of a scarf joint. FIGS. 3A and 3B are side views of the two decorative plywood boards 5, which are used to explain the second step. As illustrated in FIG. 3A, the two decorative plywood boards 5 are joined together with their longitudinal ends abutting each other. For this purpose, opposed end portions 5a and 5b of the two plywood boards 5 to be joined are scarfed as shown. Namely, as depicted by an oblique line in FIG. 3A, the end portions 5a and 5b of the two plywood boards 5 are each cut to have a tapering surface slanted with respect to the thickness direction of the plywood board 5. The respective tapering surfaces of the plywood boards 5 are formed and positioned in a complementary and parallel relation to each other. Then, as illustrated in FIG. 3B, the end portions 5a and 5b are adhesively bonded to each other to thereby join the two decorative plywood boards 5. By joining the two decorative plywood boards 5 along the respective longitudinal ends (i.e., along the respective tapering surfaces) in the above-described manner, there is provided a joined decorative plywood board unit 6 having a length substantially equal to "L" necessary to form the side board 1.

(Third Step)

A board pile 60 for forming the side board 1 for the grand piano comprises a layer of the above-described joined decorative plywood board unit 6, and a layer of the base plates 7 bonded with the joined decorative plywood board unit 6. The layer of the base plates 7 comprises a plurality of plywood base plates each formed of one or more veneer sheets. FIG. 4A is a side view showing a laminated structure of the board pile 60 comprising the layer of the joined decorative plywood board unit 6 and the base plate layer 7.

FIG. 4B is a perspective view outlining a manner in which the board pile 60, comprising the joined decorative plywood board unit 6 and a layer of the base plates 7, is fitted in a predetermined mold. They are configured in accordance with a desired curved shape of the side board 1 for the grand piano, to form the board pile 60 into the curved shape. Then the thus-curved joined decorative plywood board unit 6 and the plywood base plates 7 are stuck together. Each of the plywood base plates 7 comprises a plurality of wood plate members 7a joined together, end to end, so as to secure a length necessary for forming the side board 1. The plurality of wood plate members 7a may be joined with each other via the conventionally-known finger joints.

In FIG. 4A, the joined decorative plywood board unit 6 is positioned at the top of the board pile 60 with its decorative surface facing upward. The board pile 60 can be set to a desired thickness of the side board 1 by choosing an appropriate number of the plate members 7a included in the base plate layer 7. As illustrated, the finger-joint connected portions 7b of the individual plate members 7a, which constitute the base plate layer 7, are displaced among the plates 7 so as not to overlap in the thickness direction of the base plate layer 7. In the joined decorative plywood board unit 6, on the other hand, the two decorative plywood boards 5 are joined with each other, end to end, via the scarf joint.

In this third step, the joined decorative plywood board unit 6, comprising the two decorative plywood boards 5, and the layer of the base plates 7 are formed into the predetermined shape in a predetermined mold that is configured in accordance with the desired curved shape of the side board 1 for the grand piano, and then they are attached to each other. In this manner, the side board 1 can be manufactured. At that time, the joined decorative plywood board unit 6 is curved in such a direction where the decorative surface of the decorative plate 4 is located on an innermost side of the side board 1 and faces inwardly. Also, the layer of the base plates 7 is adhesively bonded to the outer surface of the joined decorative plywood board unit 6. Generally, the outer-side surface of the side board 1 (i.e., outer surface of the body of the piano) is subjected to one or more coatings of paint; thus, there is no need to stick a decorative plate to the outer surface of the side board 1. Namely, in the side board 1, the decorative surface of the joined decorative plywood board unit 6 is intended to decorate the inner-side surface of the body 11.

Namely, according to this embodiment of the side board manufacturing method, the decorative plywood boards 5 are prepared in advance in the first step, and then, in the second step, a plurality of (two in the illustrated example) decorative plywood boards 5 are joined, end to end, to provide a joined decorative plywood board unit 6, in order to secure the necessary length of the side board 1.

Thus, as compared to the conventional technique which requires two operations for joining the decorative plywood boards: joining of the plate members 2 forming the decorative-plate base 3; and joining of the decorative plates 4, the embodiment of the present invention has to perform only one operation for joining the decorative plywood boards, and thus the embodiment can reduce the necessary number of the steps. In this way, it is possible to achieve an enhanced efficiency in manufacturing side boards for grand pianos. Further, because the decorative plywood boards 5 are joined end to end by a scarf joint, i.e. because the end portions 5a and 5b of two decorative plywood boards 5 to be joined are cut to have mating tapering surfaces, the embodiment of the present invention can significantly increase a joined area of the two decorative plywood boards 5 when compared with the conventional method where two plywood boards are joined at their respective end surfaces lying perpendicular to a horizontal plane. Further, the thus-arranged embodiment of the invention can reduce the possibility that the joined portions of the decorative plywood boards 5 are displaced from each other in the thickness direction of the boards 5. It can also enhance the joining strength between the decorative plywood boards 5. In addition, a joint line between the decorative plywood boards 5 can be made less visible on the decorative surface (surface of the decorative plates 4) of the finished board pile 60, which can significantly improve the appearance of the finished decorative surface. Furthermore, with the scarf joint, the joined positions between the respective plate members 2 and between the decorative plates 4 of the two decorative plywood boards 5 can be distributed over the tapering surfaces, which can thereby avoid the application of the adhesive agent from causing a concentrated thickness increase in the joined portions.

The embodiments have been described as forming the decorative plywood board 5 by sticking a single decorative plate 4 to the decorative-plate base 3 formed of a plurality of plate members 2, however the decorative plywood board 5 is not limited to such construction. For example, the number of the plate members 2 may be chosen as desired without being limited to just two. Further, a plurality of the decorative plates 4, rather than just one decorative plate 4, may be stuck to the decorative-plate base 3. Also, the decorative plywood board 5 may be constructed by appropriately combining one or more plate members 2 and the decorative plates 4.

Further, whereas the decorative plate 4 has been described as being attached to only one surface of the decorative plywood board 5, it may be attached to both, i.e. the upper and lower surfaces of the plywood board 5.

Furthermore, in the decorative-plate base 3, a plate of metal, plastic or other suitable material may be interposed between a plurality of the wood plate members 2. In still another alternative, a plate of metal, plastic or other suitable material may be interposed between the joined decorative plywood board unit 6 and the layer of the base plates 7 as illustrated in FIG. 4A. In yet another alternative embodiment, the layer of the base plates 7 may be formed of metal, plastic or other suitable material.

Furthermore, whereas the preferred embodiment has been described in relation to the case where the board pile 60 is used as the side board 1 of the grand piano body 12, it may be used for various other suitable plywood-made components other than the side board. The board pile 60 may also be used as a component part for any other musical instrument other than a grand piano, such as an upright piano, an electronic keyboard instrument and the like.

What is claimed is:

1. A method for manufacturing a component part for a musical instrument, comprising the steps of:

making a decorative plywood board by attaching together at least one plywood base plate member and at least one decorative plate;

making a decorative plywood board unit by attaching a plurality of the decorative plywood boards to each other by a scarf joint;

making at least one base plate by attaching a plurality of base plate members to each other by a finger joint; and attaching the decorative plywood board unit and the at least one base plate to each other in order to form a laminated structure so that the scarf joint of the decorative plywood board unit is arranged in a position displaced from the finger joint of the base plate in a thickness direction of the laminated structure.

2. A method as claimed in claim 1, wherein said step of attaching further includes forming the decorative plywood board unit into a curved shape in accordance with a predetermined curved shape of the component part for a musical instrument.

3. A method as claimed in claim 1, wherein the component part for a musical instrument is a side board for a piano, and the component part is shaped in accordance with a curved shape of a side board.

4. A method as claimed in claim 1, wherein said step of making a decorative plywood board includes interposing at least one plate between at least two plywood base plate members.

5. A method as claimed in claim 1, wherein said step of making a decorative plywood board includes interposing at least one of a metal plate and a plastic plate between at least two plywood base plate members.

6. A method as claimed in claim 1, wherein said step of attaching the decorative plywood board unit and the at least one base plate includes interposing at least one plate between the decorative plywood board unit and the at least one base plate.

7. A method as claimed in claim 1, wherein said step of attaching the decorative plywood board unit and the at least one base plate includes interposing at least one of a metal plate and a plastic plate between the decorative plywood board unit and the at least one base plate.

* * * * *